United States Patent [19]

Poillon et al.

[11] Patent Number: 5,062,641
[45] Date of Patent: Nov. 5, 1991

[54] PROJECTILE TRAJECTORY DETERMINATION SYSTEM

[75] Inventors: Nannette Poillon, Stamford; Howard Canistraro, West Hartford; Ronald F. Sienko, Southbury, all of Conn.

[73] Assignee: Nannette Poillon, New York, N.Y.

[21] Appl. No.: 413,789

[22] Filed: Sep. 28, 1989

[51] Int. Cl.$^5$ ............................................. A63B 69/36
[52] U.S. Cl. .......................... 273/181 C; 273/181 R; 273/181 G; 273/183 R
[58] Field of Search ........... 273/181 R, 181 C, 181 K, 273/183 R, 183 A, 185 R, 185 A, 185 B, 348, 372, 181 G

[56] References Cited

U.S. PATENT DOCUMENTS

| | | | |
|---|---|---|---|
| 2,331,236 | 10/1943 | Schaefer | 273/181 C |
| 2,784,000 | 3/1957 | Simjian | 273/181 C |
| 2,784,001 | 3/1957 | Simjian | 273/185 A |
| 2,954,232 | 9/1960 | Auer | 273/185 R |
| 3,678,495 | 7/1972 | Gilbert | 273/372 |
| 3,857,022 | 12/1974 | Rebane et al. | 273/372 |
| 3,938,809 | 2/1976 | Gentiluomo | 273/184 R |
| 4,086,630 | 4/1978 | Speiser et al. | 273/185 A |
| 4,437,672 | 3/1984 | Armantrout et al. | 273/185 B |

FOREIGN PATENT DOCUMENTS

| | | | |
|---|---|---|---|
| 0278150 | 8/1988 | European Pat. Off. | 273/183 R |
| 2005549 | 4/1979 | United Kingdom | 273/185 B |
| 2154146 | 9/1985 | United Kingdom | 273/185 A |

OTHER PUBLICATIONS

Kelley, "A Hot New Club for Par—Tee Animals" *Washington Post*, Magazine, Feb. 1988, pp. 12-13.

*Primary Examiner*—Edward M. Coven
*Assistant Examiner*—Jessica J. Harrison
*Attorney, Agent, or Firm*—Grimes & Battersby

[57] ABSTRACT

A system that accurately determines the location of the point of impact of a projectile, such as a golf ball, on a screen. A timer is provided that is activated when the projectile leaves a start point positioned at a known location. Upon impact of the projectile on the screen, a sound wave is produced that travels to a plurality of sound wave detectors. The system measures the time the sound wave travels to the plurality of sound wave detectors. These travel times are utilized to determine the point of impact of the projectile on the screen. The point of impact and flight travel time is used to determine the trajectory and velocity of the projectile. These parameters are then used to determine the distance the projectile would have traveled if unimpeded.

9 Claims, 3 Drawing Sheets

PROJECTILE TRAJECTORY DETERMINATION SYSTEM

BACKGROUND OF THE INVENTION

1. Field of the Invention

The present invention relates to a method and apparatus for determining the point of impact and average velocity of a projectile on a screen. In particular, the present invention has utility in machines and systems that simulate sports games and, especially, games that desire determination of the flight of the projectile. Such a sports game, for example, is a golf simulation game.

Such golf simulation games are generally known and are usually of the size that fit indoors, namely within a premises. These simulation games provide a tee area, a target area and, in some instances, a putting area. The player tees off in a normal manner and his drive is measured and relayed in yardage of unemployed travel to simulate a drive on an actual golf course. The simulation is accomplished by appropriate controls that receive signals from a specially designed screen which is impacted by the golf ball.

The present invention concerns a system for accurately determining the point on the screen which is impacted by the driven projectile, such as a golf ball. With the determination of the point of impact in relation to the golf tee or the start point from which the projectile began its flight, suitable calculations can be made to determine the projectile's trajectory and velocity.

2. Description of the Prior Art

The prior art includes golf simulating machines of the general types shown in U.S. Pat. Nos. 3,508,440 to Murphy and 3,712,624 to Conklin. These patents attempt to simulate a golf game and include tee areas, screens to receive a driven ball and systems to determine flight characteristics or trajectory of the ball. A problem in the past has been that of accurately determining the characteristic of the ball's trajectory.

The U.S. Pat. Nos. 2,331,236 and 2,331,237 to Schaeffer relate to a golf practice screen employing acoustics but rely upon an arrangement in which the intensity of the sound created by the ball impacting the screen is a function of the velocity. The system of these patents register the intensity of the ball impacting the screen. Unlike these Schaeffer patents, the present invention calculates time difference of the first arrival of the acoustical wave at various strategic sound wave detection device locations to determine the point of impact.

Other prior patents include U.S. Pat. No. 4,009,883 to Yellowlees which produces an impact intensity signal from a microphone which is converted to a meter reading of an impact. Also, U.S. Pat. No. 2,784,006 to Semjian which provides frequency tuned strips to indicate the location of impact. Further, U.S. Pat. No. 2,012,166 to Roberts measures velocity with the purpose of teaching a consistent swing tempo to the player.

The present invention, unlike the prior art, relies on a unique acoustical arrangement that through the measurement of time differentials and an appropriate algorithm locates the point of impact of the ball on the screen.

SUMMARY OF THE INVENTION

Against the foregoing background, it is a primary object of the present invention to provide a system in which a screen is impacted by a projectile and the point of impact on the screen is accurately determined.

It is another primary object of the present invention to provide such a system in which the screen receives the impact of the projectile and through acoustical means an accurate determination is made of the point of impact.

It is a further object of the present invention to provide such a system for determining the point of impact of a projectile on the screen by use of acoustics, namely the time difference of the arrival of the first acoustical wave at a plurality of sound wave detection locations, is used to determine the point of impact of the projectile.

It is a still further object of the present invention to provide such a screen for a sports simulation game in which the trajectory of a projectile can be determined by such an acoustical system that measures time differential of the first arrival of an acoustical wave emanating from the projectile's point of impact to a plurality of sound wave detectors.

It is yet another object of the present invention to provide such a system which also determines the trajectory and the velocity of the projectile.

In general, the system of the present invention contemplates a suitably mounted screen arrangement that includes a plurality of spaced sound wave detectors. After a projectile is struck at its start position, it impacts the screen and an acoustic wavefront emanates from the projectile's point of impact on the screen and is received by each of the plurality of sound wave detectors. The difference in time of the first arrival of the acoustic wavefront at each sound wave detector determines the impact point. Also, the time of flight and flight path distance from the start point of the projectile to the point of impact is accurately determined and from this information certain characteristics of the trajectory of the projectile can be ascertained.

BRIEF DESCRIPTION OF THE DRAWINGS

The foregoing and still other objects and advantages of the present invention will be more apparent from the following detailed explanation of the preferred embodiments of the invention in connection with the accompanying drawings herein in which.

DESCRIPTION OF THE PREFERRED EMBODIMENTS

Figure 1:
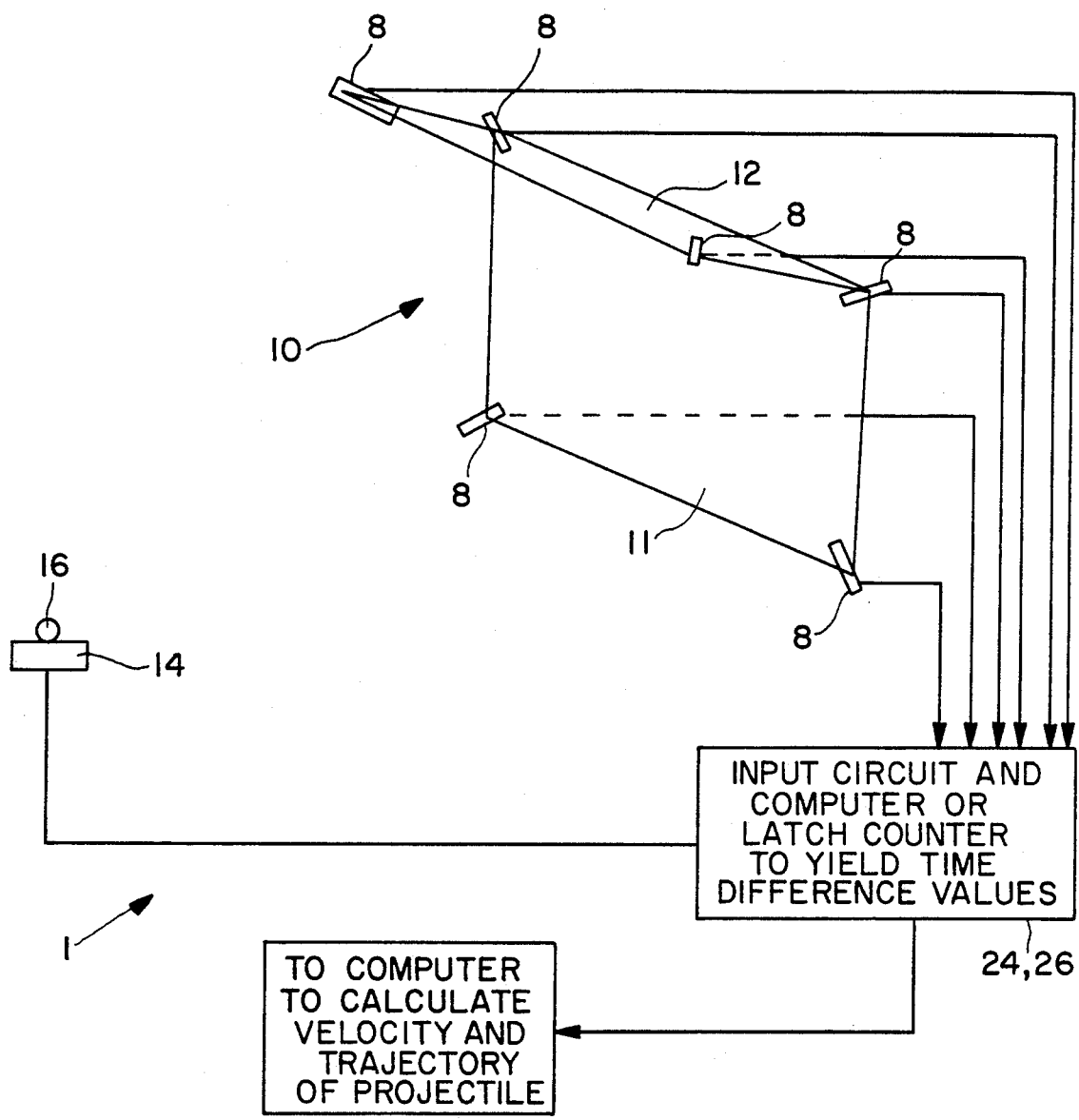
FIG. 1 is a schematic view of the system of the present invention.

Referring now to the drawings and more particularly to FIG. 1, there is shown the system with the screen assembly of the present invention which system is represented by reference numeral 1. The screen assembly 10 comprises an upright screen portion 11 and a overhead screen portion 12 which are distantly located from a start point, such as a golf tee 14. The purpose of the two screens is to allow for a wider variation in projectile elevation. This can also be accomplished with a continuous screen of other variations in shape and size.

It is understood that in a projectile simulator of this type, a player will drive the projectile, such as for example a golf ball 16, from the start point or golf tee 14 to the screen assembly 10 where it will impact either screen portion 11 or screen portion 12. The trajectory and average velocity of the projectile will be determined which will allow for the accurate calculation of the projectile's travel and final rest position as if the projectile had not been impeded by the screen. The present invention is directed to the particular screen assembly for determining trajectory and velocity and, thereafter, producing a simulation of what the trajectory would be in an unimpeded environment.

The screen portions 11 and 12 are made of a suitable material, such as vinyl, which is capable of receiving the impact of a driven projectile. The screen material is chosen to preferably produce a unique and readily detectable sound when impacted by the projectile. The screen may be mounted in any convenient manner as by a wood or metal framework, the particular mounting means not being a part of the present invention. The screen can be angled forward to lessen the rebound effect of the projectile.

In one embodiment of the invention shown, in FIG. 1, a sound wave detector, such as a microphone 8, is placed at each corner of the screen. The microphones 8 are angled to the interior areas of the screen and are, preferably, shielded in the rear in a sound absorbent chamber or anechoic chamber. This chamber is needed to filter out undesired waves which could effect the measurement. The time of the first acoustic arrival of the sound wave at each microphone must be measured to a degree of accuracy on the order of 1/10,000 of a second. This type measurement is accomplished by using a computerized data acquisition system or high speed latch/counter electrical equipment.

When the projectile 16 impacts the screen, there is produced a spherically radiating acoustic wavefront. The acoustic wavefront projects spherical sound wave emissions which are the sound propagation route from the point of impact. As the sphere expands outward, it is detected by each microphone. This measurement relies on the fact that the sound wave radiates from a point source at equal velocities in all directions as shown in FIG. 2b. The time the sound wave is detected at each microphone is the first time the sound wave reaches that microphone.

Figure 2A:
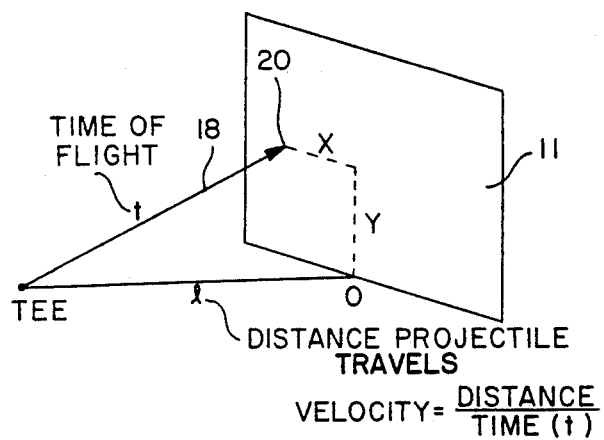
FIGS. 2a, 2b, 2c and 2d are diagrammatic representations that serve to explain the velocity and trajectory determining aspects of the system.
Figure 2B:
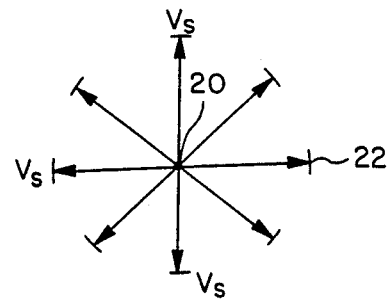

FIG. 2a illustrates the method used for measuring the distance the projectile had to travel from the start point to the screen. Based upon this measurement, the velocity of the projectile can be readily determined inasmuch as the time of flight is also accurately measured. Numeral 18 indicates the projectile's path from the start point to screen 11 and t designates the time of flight. The point of impact 20 is determined by the plurality of microphones and a suitable algorithm, as hereinafter disclosed, with the result that the distance traveled by the projectile is calculated. By the calculation of dividing the distance by time, t, the velocity of the projectile over its path of flight is determined.

FIG. 2b illustrates the basis of the projectile's position measurement. This measurement relies on the fact that sound radiates in a sphere from a point source. In FIG. 2b, 20 indicates the point of impact on the screen and the arrows on the radial lines indicate the direct distance the sound wave has propagated. Numeral 22 indicates the spherical wave front of the acoustical sound radiating outwardly from 20 and Vs designates the velocity of the sound wave. It is understood that the velocity of sound is essentially constant in a relatively constant atmosphere.

Figure 2C:
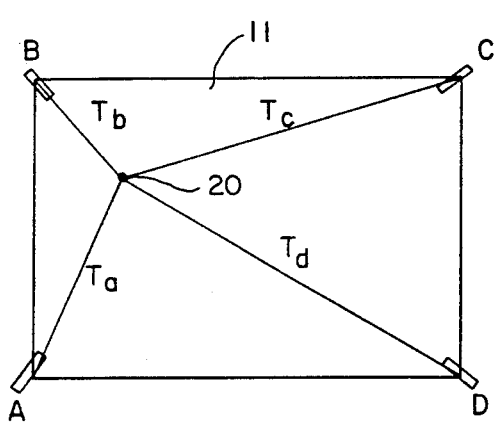
Figure 2D:
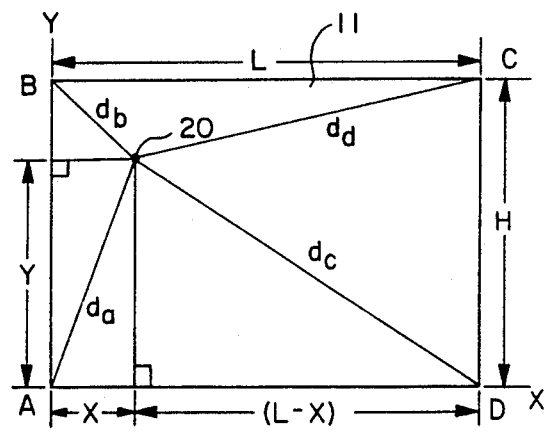

As shown in FIG. 2c, it is apparent that it will take different periods of time for sound to travel from the point of impact 20 to each of the four microphones located at points A, B, C, and D. The travel time to each of the four microphones is indicated by Ta, Tb, Tc, Td, respectively. These distances are the hypotenuses of several right triangles whose bases are related to the X and Y coordinates on the screen as shown in FIG. 2d. The relative time differences between the first acoustic arrival at each microphone can now be measured using a known device, such as for example, a computer or a latch/counter.

The difference in values can be expressed as mathematical combination of the x and y coordinates of the particular hit location.

It should be understood that the number of microphones or sound wave detectors can vary from more than one to an infinite number to work effectively. Also, the placement of the microphones on the screen can vary.

FIG. 2d indicates the distances da, db, dc, dd from the point of impact 20 on the screen to the respective microphones located at positions A, B, C and D, respectively. The horizontal length of the screen is designated L and the coordinates of the impact location 20 are designated X and Y.

The time difference values can be expressed as mathematical combinations of the X and Y coordinates of the hit location by employing the pythagorean theorem $X^2 + Y^2 = d^2$ as follows:

$$db - da = \text{known No.} = \sqrt{(H - Y)^2 + X^2} - \sqrt{X^2 + Y^2}$$

$$da - da = \text{known No.} = \sqrt{(L - X)^2 + Y^2} - \sqrt{X^2 + Y^2}$$

Any and all reductions of the basic governing equations maybe used, therefore not altering the present invention.

Thus, it is seen that by measuring the time differences between the first arrivals at two pairs of microphones, an X and Y coordinate for the impact point can be determined.

Figure 3:
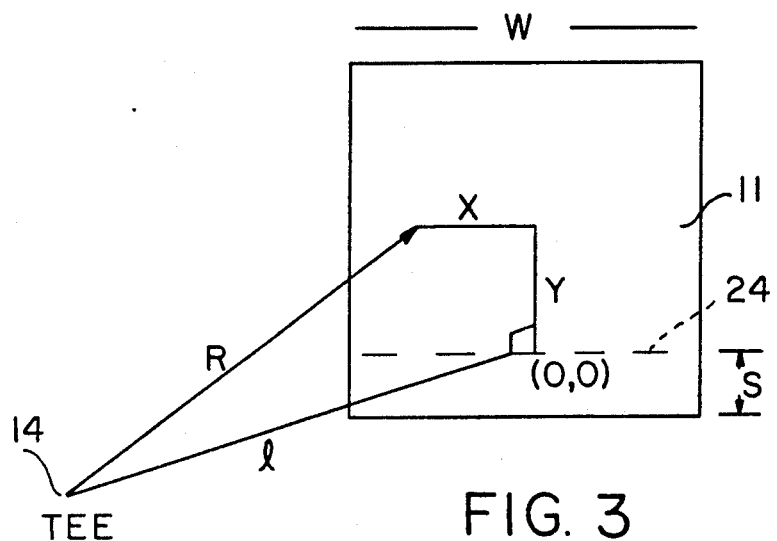
FIG. 3 illustrates an embodiment of the present invention utilizing a single screen.
Figure 4:
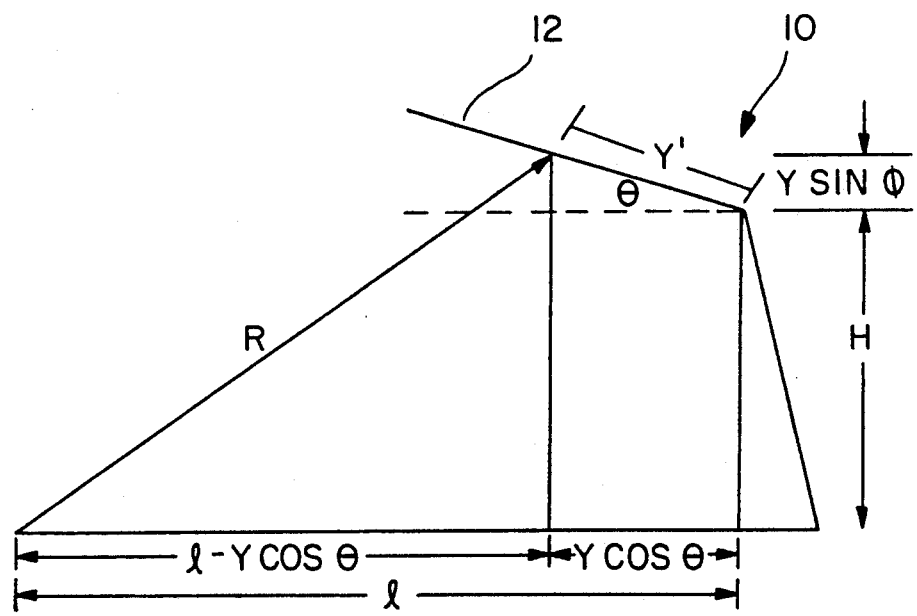
FIG. 4 illustrates another embodiment of the invention utilizing a either two separate screens or a continuous screen which includes an overhead screen portion in addition to the upright screen portion.

FIGS. 3 and 4 illustrate two situations in the determination of the projectile's flight path and each has a different algorithm for the projectile flight length indication.

In FIG. 3, the projectile driven from the start point 14 impacts the screen 11 which is disposed in the upright position. The projectile's path is indicated at R and the distance from the start point to the line 24 which is the line on the screen perpendicular to the start point, (Y=0) is designated L. The coordinates of the point of impact from the origin (0,0) are designated X, Y. The width of the screen is indicated at W and the height from the bottom of the screen to the line perpendicular to the start point is shown as S.

It is seen that the projectile path R is calculated from the formula $R^2 = X^2 + Y^2 + 1^2$ where 1 is a constant representing the perpendicular distance from the start point 14 to the screen 11.

In FIG. 4, there is shown the relative angular relations of the screen assembly 10. Upright screen 11 is angled forward and overhead screen is angled upward at an angle $\theta$. As seen from this diagrammatic illustration height H and length l are constants. The coordinate Y is obtained from the microphones and hence R can be calculated:

$$R^2 = (l - Y'\cos\theta)^2 + (H + Y'\sin\theta)^2 + X^2$$

By the use of this algorithm, the measurement of projectile flight distances can be ascertained provided the impact positions are known.

Referring now back to FIG. 1, when a player propels a projectile, such as for example a golf ball, from the start point, such as for example on a tee 14, a timer 26 commences pulsing at the precise time the projectile's flight begins. The timer 26 is connected to a computer 24 which receives these timing pulses. When the projectile impacts the screen, sound waves are emitted from the point of impact in a spherical or spiral wavefront as illustrated in FIG. 2b. As the wavefront reaches each of the microphones 8, the respective microphone responds, to signal the computer and the various times of first acoustical arrival at each microphone are determined as discussed above in connection with the illustration of FIG. 2c. These times are converted to yield distance differences from which the X and Y coordinates are determined. It is understood that the above described calculations are programmed into the computer 24.

The point of impact of the ball on the screen is an indication of the trajectory of the projectile or ball from the start point or tee 14 to the screen. Based on the point of impact and average velocity the overall trajectory that the projectile would take if unimpeded by the screen can be determined. This determination can be projected on the screen for the player to observe as a simulated projectile flight path.

It is understood that this system can be used in simulation games, such as for example, golf, baseball, football, hockey and other sports simulation games. It is believed that this system can be used in any simulation game in which the flight of a projectile is to be measured.

Having thus described the invention with particular reference to the preferred forms thereof, it will be obvious that various changes and modifications may be made therein without departing from the spirit and scope of the invention as defined in the appended claims.

What is claimed is:

1. A system for determining the point of impact and velocity of a projectile that is driven from a start point and impacted upon a screen, comprising:

a start point which is a known position from which the projectile commences its flight;

a target screen located a fixed distance from said start point and adapted to be impacted by the projectile;

at least three sound wave detectors adapted to be located at predetermined locations adjacent to any portion of said screen, each of said sound wave detectors being disposed to receive a sound wave originating and radiating from the point of impact of the projectile on said screen;

first means for measuring the distance from said start point to the actual point of impact of the projectile on said target screen, and for determining the flight time of the projectile;

second means for determining the first time the sound wave reaches each of said sound wave detectors;

third means for determining the time difference values amongst said second means determinations to calculate by using an algorithm that is based upon the pythagorean theorem the calculated point of impact of the projectile; and fourth means for calculating the initial velocity of the projectile by using said first means and the calculated point of impact of said third means to calculate three vector components of the initial velocity of the projectile;

wherein said third means and said fourth means provide a calculated point of impact and a calculated initial velocity, respectively.

2. The system of claim 1, wherein said at least three sound wave detectors are three detectors.

3. The system of claim 2, wherein the pythagorean theorem is $$da = \sqrt{X^2 + Y^2} \quad db = \sqrt{(H - Y)^2 + X^2}$$

$$dc = \sqrt{Y^2 + (L - X)^2}$$

with da the distance of the projectile at the point of impact on said screen from a first sound wave detector, db the distance of the projectile at the point of impact on said screen from a second sound wave detector, dd the distance of the projectile at the point of impact on said screen from a third sound wave detector, H the height of said screen, L the length of said screen, Y the vertical height of the projectile on said screen, and X the horizontal distance from the first sound wave detector to the projectile at the point of impact on said screen.

4. The system of claim 1, wherein said at least three sound wave detectors are four detectors, and wherein said screen is in the shape of a rectangle with the four detectors each located adjacent a corner of said target screen.

5. The system of claim 4, wherein the pythagorean theorem is $$db - da = \text{unknown} = \sqrt{(H - Y)^2 + X^2} - \sqrt{X^2 + Y^2}$$

$$dc - da = \text{unknown} = \sqrt{(L - X)^2 + Y^2} - \sqrt{X^2 + Y^2}$$

with da the distance of the projectile at the point of impact on said screen from a first sound wave detector, db the distance of the projectile at the point of impact on said screen from a second sound wave detector, dc the distance of the projectile at the point of impact on said screen from a third sound wave detector, H the height of said screen, L the length of said screen, Y the vertical height of the projectile on said screen, and X the horizontal distance from the first sound wave detector to the projectile at the point of impact on said screen.

6. The system of claim 1, wherein said screen includes a substantially upright portion and an overhead portion.

7. The system of claim 6, wherein said overhead portion is disposed at a small angle with the horizontal.

8. The system of claim 1, further comprising including timer means adapted to be activated as the projectile is driven from said start point.

9. A method of determining the location of impact on a screen of a projectile driven from a start point located a given distance from said screen comprising the steps of:

initiating a timer when the projectile is driven from said start point to determine initial velocity;

receiving an emitted sound wave produced by the projectile at the point of impact on said screen and measuring the length of time from initiation of the timer;

measuring the time of propagation of the sound wave from the point of impact to the first time the sound wave reaches each one of a first three of a plurality of sound wave detectors located at predetermined points adjacent to said screen;

calculating the time difference values amongst the first time the sound wave reaches each of said first three of said plurality of sound waves to calculate by using an algorithm that is based upon the pythagorean theorem the calculated point of impact of the projectile;

calculating the initial velocity of the projectile by using the determined initial velocity and the calculated point of impact to calculate three vector components of the initial velocity of the projectile, wherein both a calculated point of impact and a calculated initial velocity are determined.

* * * * *